United States Patent
Chan et al.

(10) Patent No.: US 10,657,677 B2
(45) Date of Patent: May 19, 2020

(54) COGNITIVE SITUATION-AWARE VISION DEFICIENCY REMEDIATION

(71) Applicant: INTERNATIONAL BUSINESS MACHINES CORPORATION, Armonk, NY (US)

(72) Inventors: Yuk L. Chan, Rochester, NY (US); Lawrence A. Clevenger, Rhinebeck, NY (US); Alain Loiseau, Williston, VT (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/830,207

(22) Filed: Dec. 4, 2017

(65) Prior Publication Data

US 2019/0172229 A1    Jun. 6, 2019

(51) Int. Cl.
*G06T 11/00* (2006.01)
*G06K 9/62* (2006.01)
*G06T 11/60* (2006.01)

(52) U.S. Cl.
CPC .......... *G06T 11/001* (2013.01); *G06K 9/6267* (2013.01); *G06T 11/60* (2013.01)

(58) Field of Classification Search
CPC ........ G06T 11/00; G06T 11/001; G06T 11/40; G06T 11/60; G06K 9/6267; G06K 9/627; G06K 2009/2045; G06K 2009/2054; G06K 9/3266; G06K 9/34
See application file for complete search history.

(56) References Cited

U.S. PATENT DOCUMENTS

| 6,442,473 | B1 | 8/2002 | Berstis |
| 8,384,532 | B2 | 2/2013 | Szczerba et al. |
| 8,493,198 | B1* | 7/2013 | Vasquez ................ B60Q 9/008 340/425.5 |
| 8,629,903 | B2 | 1/2014 | Seder et al. |

(Continued)

OTHER PUBLICATIONS

Chan, Yuk L. et al., Pending U.S. Appl. No. 15/830,204 entitled "Cognitive Situation-Aware Vision Deficiency Remediation" filed Dec. 4, 2017.
Chan, Yuk L. et al., Pending U.S. Appl. No. 15/830,209 entitled "Cognitive Situation-Aware Vision Deficiency Remediation" filed Dec. 4, 2017.
Chan, Yuk L. et al., Pending U.S. Appl. No. 15/830,211 entitled "Cognitive Situation-Aware Vision Deficiency Remediation" filed Dec. 4, 2017.

(Continued)

*Primary Examiner* — Dwayne D Bost
*Assistant Examiner* — Stephen M Brinich
(74) *Attorney, Agent, or Firm* — Cantor Colburn LLP; William Kinnaman

(57) ABSTRACT

Embodiments include methods, systems, and computer program products for remediating a color vision deficiency. Aspects include receiving a time dependent location information for a user. Aspects also include receiving images of a plurality of objects, wherein each of the plurality of objects corresponds to the time dependent location information and, for each of the plurality of objects, identifying an object type and an object color. Aspects also include determining a number of distinguishable colors required to remediate a color vision deficiency and a number of available colors and overlaying one of the plurality of objects with an available color responsive to a determination that the number of distinguishable colors does not exceed the number of available colors.

20 Claims, 4 Drawing Sheets

(56) References Cited

U.S. PATENT DOCUMENTS

| | | |
|---|---|---|
| 9,373,046 B2 | 6/2016 | Nelson |
| 9,663,035 B2 | 5/2017 | Nakata et al. |
| 10,102,763 B2 | 10/2018 | Mihai |
| 2003/0112132 A1 | 6/2003 | Trajkovic et al. |
| 2004/0051659 A1 | 3/2004 | Garrison |
| 2004/0085327 A1 | 5/2004 | Jones et al. |
| 2006/0033880 A1 | 2/2006 | Korneluk |
| 2006/0044119 A1 | 3/2006 | Egelhaaf |
| 2006/0061586 A1 | 3/2006 | Brulle-Drews |
| 2007/0103341 A1 | 5/2007 | Kreiner et al. |
| 2013/0335435 A1 | 12/2013 | Ambrus et al. |
| 2014/0098008 A1 | 4/2014 | Hatton |
| 2015/0262487 A1 | 9/2015 | Cazanas |
| 2016/0063761 A1 | 3/2016 | Sisbot et al. |
| 2016/0070965 A1 | 3/2016 | Nelson |
| 2016/0379593 A1* | 12/2016 | Borenstein ........... H04N 13/257 348/62 |
| 2017/0212513 A1 | 7/2017 | Iida et al. |

OTHER PUBLICATIONS

List of IBM Patents or Patent Applications Treated as Related; (Appendix P), filed Feb. 26, 2018; 2 pages.

Colourblindawareness.org, "Colour Blind Awareness Day 2017—Colour Blindness," URL: http://www.colourblindawareness.org/colour-blindness/; Retrieved on Feb. 26, 2018; 2 pages.

Hall-Geisler, "Augmented Reality Is Coming to Your Windshield—A holographic heads-up display ships later this year," Popular Science; May 14, 2015; URL: https://www.popsci.com/holographic-heads-display-wayray-way-0; Retrieved on Feb. 26, 2018; 2 pages.

Hsu, "Video: GM Turning Car Windshields into Augmented-Reality Navigation Displays—Still doesn't excuse driving one-handed while texting," Popular Science; Mar. 18, 2010; URL: http://www.popsci.com/cars/article/2010-03/gm-wants-turn-c; Retrieved on Feb. 26, 2018; 2 pages.

Mel, et al., "The NIST Definition of Cloud Computing," Recommendations of the National Institute of Standards and Technology; Special Publication 800-145; Sep. 2011; 7 pages.

* cited by examiner

COGNITIVE SITUATION-AWARE VISION DEFICIENCY REMEDIATION

BACKGROUND

The present invention relates to color vision deficiency, and more specifically, to cognitive and situation-aware systems and methods for assistance with color vision deficiencies.

Vision deficiencies, such as color deficiencies including color blindness, can impair or prevent a person's ability to distinguish different colors. Different types and degrees of color vision impairment exist, ranging from an impaired ability to distinguish between two different colors to complete inability to perceive color. For instance, reading traffic lights, distinguishing between different types of signs, and discerning different objects from each other frequently depend on color distinctions that can be difficult or impossible to perceive for affected individuals. Color vision deficiencies can not only be inconvenient and impose difficulties in daily life, but can also be hazardous to affected individuals and the public at large.

SUMMARY

In accordance with one or more embodiments, a computer-implemented method for remediating a color vision deficiency is provided. The method includes receiving, by a processor, a time dependent location information for a user. The method also includes receiving, by the processor, images of a plurality of objects, wherein each of the plurality of objects corresponds to the time dependent location information and, for each of the plurality of objects, identifying an object type and an object color. The method also includes determining a number of distinguishable colors required to remediate a color vision deficiency and a number of available colors. The method also includes overlaying one of the plurality of objects with an available color responsive to a determination that the number of distinguishable colors does not exceed the number of available colors.

In accordance with a further embodiment, a processing system for remediating a color vision deficiency includes a processor in communication with one or more types of memory. The processor is configured to receive a time dependent location information for a user. The processor is also configured to receive images of a plurality of objects, wherein each of the plurality of objects corresponds to the time dependent location information and, for each of the plurality of objects, identifying an object type and an object color. The processor is also configured to determine a number of distinguishable colors required to remediate a color vision deficiency and a number of available colors. The processor is also configured to overlay one of the plurality of objects with an available color responsive to a determination that the number of distinguishable colors does not exceed the number of available colors.

In accordance with another embodiment, a computer program product for remediating a color vision deficiency is provided. The computer program product includes a computer readable storage medium readable by a processing circuit and storing program instructions for execution by the processing circuit for performing a method. The method includes receiving a time dependent location information for a user. The method also includes receiving images of a plurality of objects, wherein each of the plurality of objects corresponds to the time dependent location information and, for each of the plurality of objects, identifying an object type and an object color. The method also includes determining a number of distinguishable colors required to remediate a color vision deficiency and a number of available colors. The method also includes overlaying one of the plurality of objects with an available color responsive to a determination that the number of distinguishable colors does not exceed the number of available colors.

BRIEF DESCRIPTION OF THE DRAWINGS

The subject matter of the present invention is particularly pointed out and distinctly claimed in the claims at the conclusion of the specification. The foregoing and other features and advantages of the one or more embodiments described herein are apparent from the following detailed description taken in conjunction with the accompanying drawings in which:

DETAILED DESCRIPTION

Figure 1:
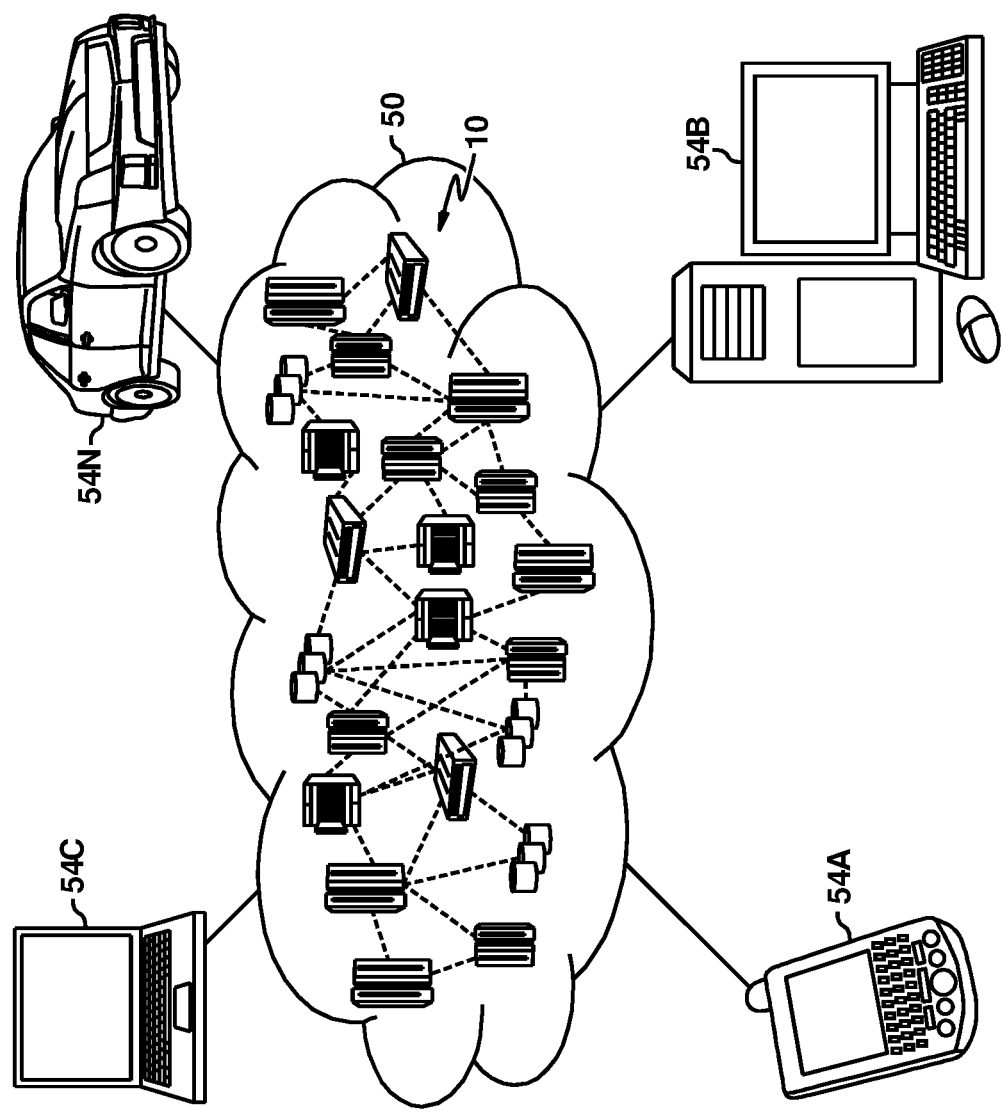
FIG. 1 depicts a cloud computing environment according to an embodiment of the present invention.

Color vision deficiencies, such as color blindness, involve a reduced ability or inability to distinguish between two or more colors. Different types of color vision deficiencies exist and the types of colors that cannot be distinguished and the level of impairment can vary widely. Color vision deficiencies are often inherited, but can also be caused to varying degrees by disease, injury, medications, or aging. Inherited color blindness affects an estimated eight percent of the male population and approximately 0.5 percent of females. Affected individuals, in some cases, are unaware of their condition until they receive testing.

Perception of color in unaffected individuals results from absorption of light by rod and cone cells in the retina. In the retina, three types of cone cells are present in normal individuals, wherein each type of cone cell is receptive to light of a specific wavelength range. The three types of cone cells, in combination, can enable normal individuals to perceive all of the wavelengths of the visible spectrum. Color vision impairment can result when one or more types of cones are impaired, altered, or absent.

Major types of color vision deficiencies include, for instance, protanopia, deuteranopia, tritanopia, protanomaly, and deuteranomaly, which can each be associated with certain permutations of color confusion that accompany cone defects or absences. Protanopia, for instance, involves the complete absence of one of the three types of cone cells in the retina, long cones. Protanopia is a type of "red-green" color blindness, although it can involve deficiencies in an array of colors in addition to red and green. Protanopia can manifest in an affected individual with certain characteristic color confusions: black is likely to be confused with many shades of red; dark brown is likely to be confused with dark green, dark orange, and dark red; some blues are likely to be confused with some reds, purples and dark pinks; and mid-greens are likely to be confused with some oranges. Tritanopia, sometimes referred to as "blue-yellow" color blindness, can manifest with blue, indigo and violet appearing greenish or black, yellow appearing the same as pink, and purple appearing as shades of red.

Hue intensity can also be misperceived by individuals affected with color vision deficiencies. For instance, in the case of protanopia, orange-tinted reds can be perceived is dim or muted yellow. In tritanopia, blue, indigo, and violet can be severely dimmed.

Impairments in the ability to distinguish between different colors, and alteration of hue intensity, can be hazardous to affected individuals and also to unaffected individuals that come in contact with such individuals. For instance, when driving on the road, vision deficiencies, such as color vision deficiencies, could impair a driver's ability to see a neighboring car if its color is similar to the background. Such impairments can put the driver and surrounding drivers at risk of collision.

Existing solutions for vision deficiencies are limited and there is no cure, for example, for color blindness. Some devices and methods have been used or proposed to provide relief to affected individuals, but special lenses that shift the existing spectrum of light to another spectrum have provided limited assistance to some affected individuals. Such lenses can bring, for example, shift the light wavelength of an imperceptible color to a wavelength that can be perceived. However, the transformation range for such lenses is static. Existing technologies fail to account for situational aspects that could impact the ability to perceive objects. Moreover, existing technologies provide unsatisfactory correction and remediation of issues stemming from impairment of contrast and brightness that can be associated with vision deficiencies.

Embodiments of the present invention provide dynamic and cognitive assistance with vision deficiencies using a situation-aware approach in time-dependent situations. Embodiments of the invention can leverage advances in mobile technologies to provide contextually-aware solutions for the perception of objects for affected individuals. Some embodiments of the invention can combine situation awareness and image processing technologies with available computing power on wearable devices to determine an appropriate color to overlay on a target image. Target images, according to embodiments of the invention, can be personalized to a user, for instance by being based upon a user's particularized vision deficiency or by being based upon a context or setting related to the image. Embodiments of the invention can overlay an image of objects having color(s) that impair perception by an individual affected by a color vision deficiency with a color or texture that can be perceived by the individual. Embodiments of the invention can provide a contextual approach by using a color replacement scheme to minimize the number of colors needed and/or the required processing capacity needed to alleviate a vision deficiency. For example, by assessing the importance of objects in a view, the replacement of colors on important objects can be prioritized to provide relevant vision-related information and assistance to a user.

It is understood in advance that although this description includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, illustrative cloud computing environment 50 according to one or more embodiments of the present invention is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
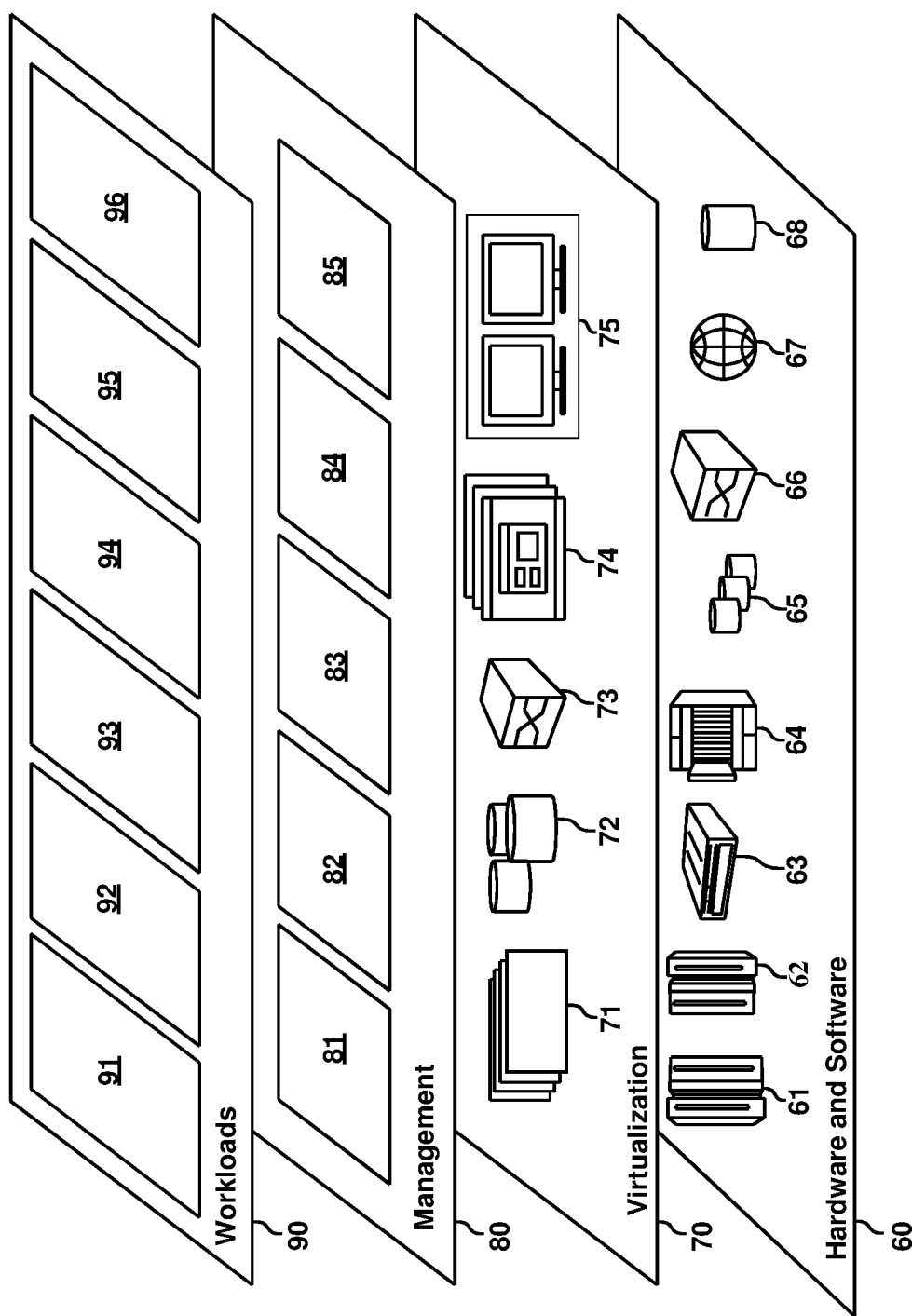
FIG. 2 depicts abstraction model layers according to an embodiment of the present invention.

Referring now to FIG. 2, a set of functional abstraction layers provided by cloud computing environment 50 (FIG. 1) according to one or more embodiments of the present invention is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and vision assistance 96.

Figure 3:
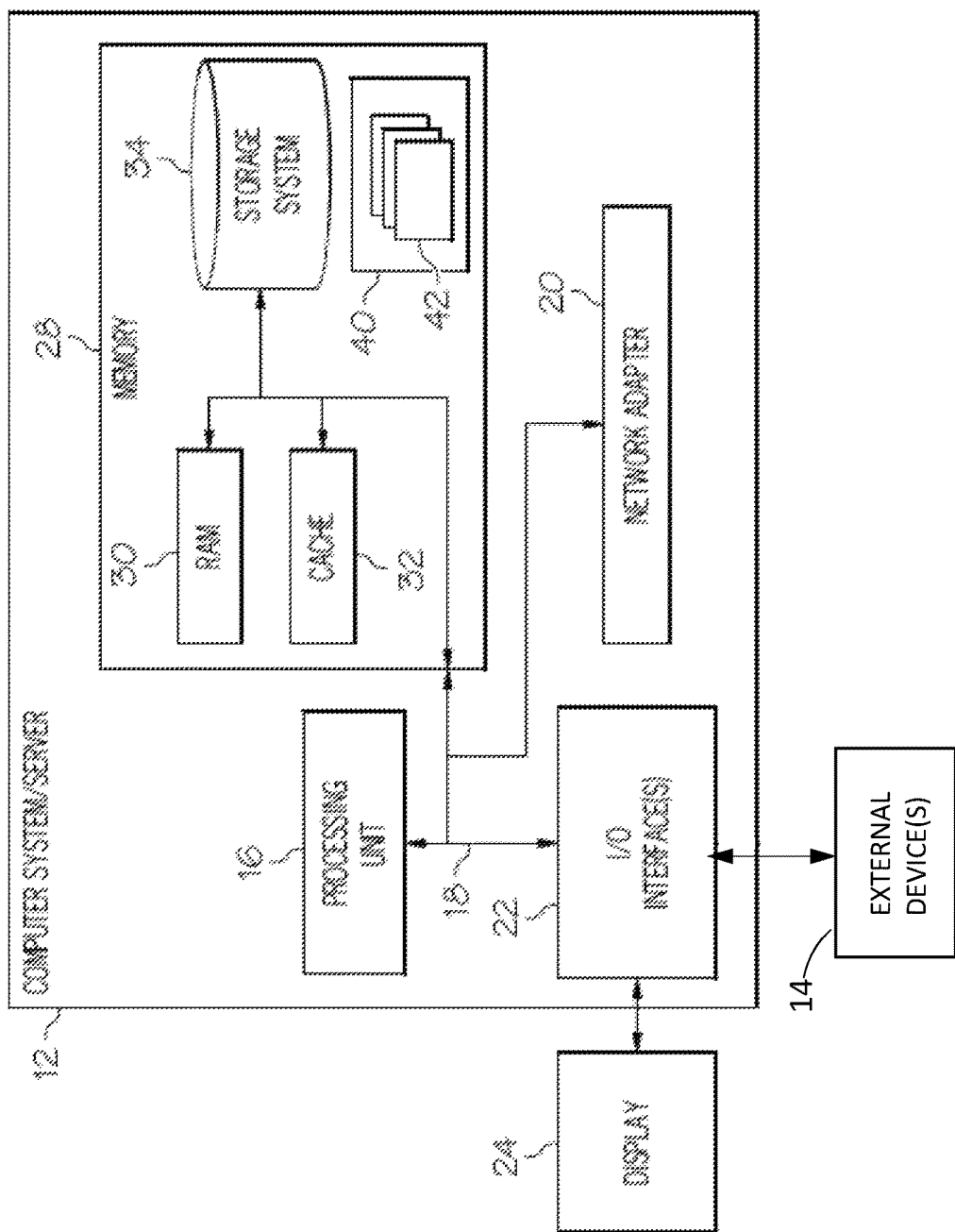
FIG. 3 depicts a computer system according to one or more embodiments of the present invention.

Referring now to FIG. 3, a schematic of a cloud computing node 100 included in a distributed cloud environment or cloud service network is shown according to one or more embodiments of the present invention. The cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 3, computer system/server 12 in cloud computing node 100 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out one or more functions and/or methodologies in accordance with some embodiments of the present invention.

Computer system/server 12 can also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
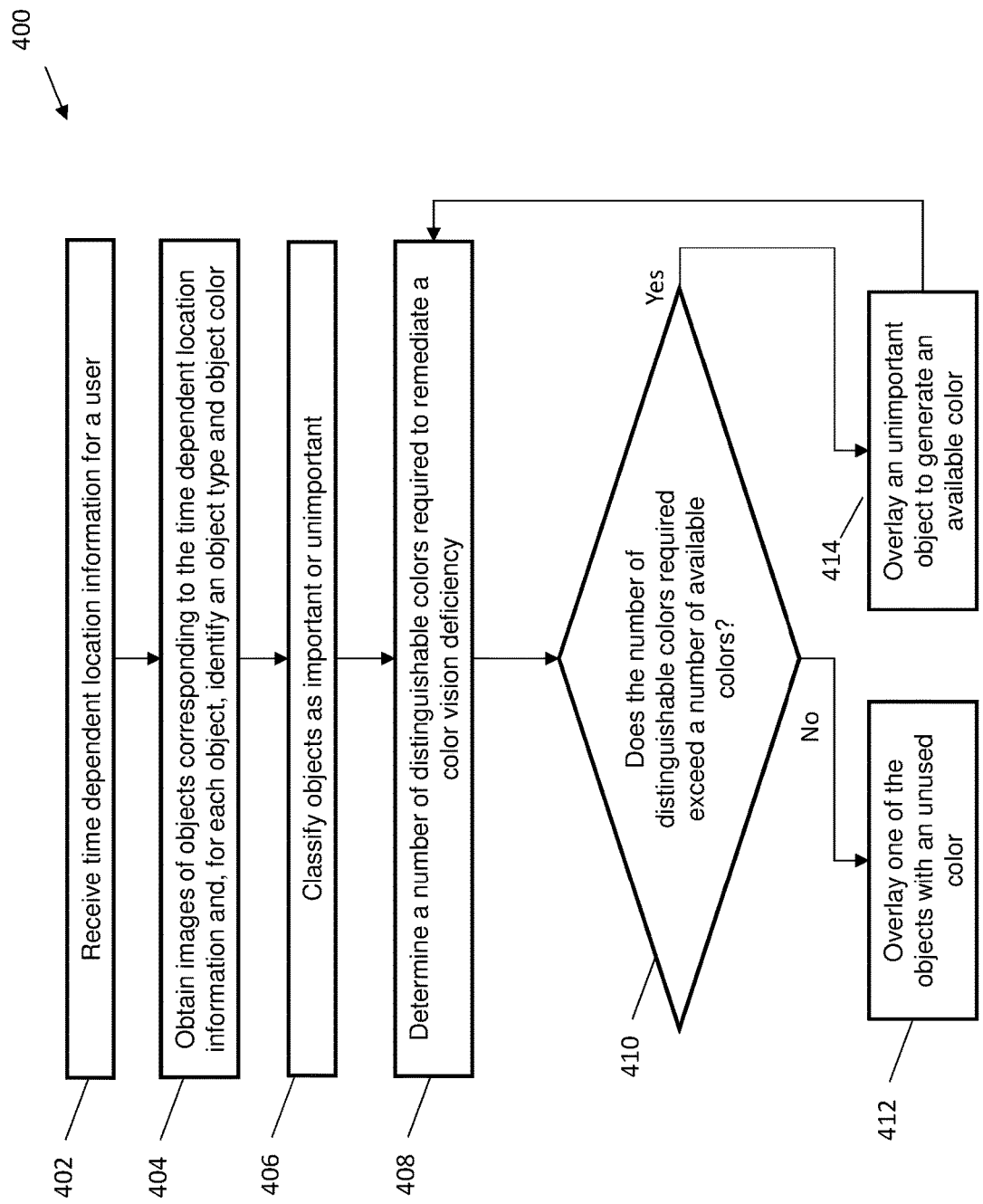
FIG. 4 is a flow diagram illustrating a method for remediating a vision deficiency according to one or more embodiments of the present invention.

Referring now to FIG. 4, a flowchart illustrating an exemplary method 400 for remediating a vision deficiency according to one or more embodiments of the present invention is shown. The method 400 includes receiving time dependent location information, such as a route, for a user, as shown at block 402. Time dependent location information can include, for example, a global positioning device (GPS)-derived route from a mobile app or from an automobile navigation system, or a location and trajectory from a global positioning device, or from manual user input.

The method 400 also includes obtaining images of objects along the route and, for each object, identifying an object type and object color as shown at block 404. Exemplary object types include, but are not limited to, a car, a wall, a fence, an undetermined object, etc. The method 400 also includes classifying objects as important or unimportant, as shown at block 406. The method 400 also includes determining the number of distinguishable colors required to remediate a vision deficiency, as shown at block 408. In some embodiments, the method includes determining, for example, a number of highly important objects that can be confused by the user (e.g., the color of walls, the color of cars).

The method 400 also includes, as shown at decision block 410, determining whether the number of distinguishable colors required exceeds a number of available colors. Distinguishable colors include all colors that can be distinguished by a user. The number of distinguishable colors required includes the number of colors that are needed to correct a vision deficiency impairment. Responsive to a determination that the number of distinguishable colors required exceeds a number of available colors, the method 400 can proceed to block 414 and overlay an unimportant object to generate a new available color.

For instance, where red is a color of some objects in a given location, if the color is in use by only unimportant objects, such as beverage containers or door mats, all red objects can be overlaid with another color that is also in use and present on unimportant objects. Thus, by overlaying unimportant objects with a color already in use, a new available color can be generated, in this case red. The new available color can subsequently be used, for instance, to distinguish a more important object. In some embodiments of the invention, the method 400 can then return to block 408.

Responsive to a determination that the number of distinguishable colors required does not exceed a number of available colors, the method 400 can proceed to block 412 and overlay one of the objects with an unused color. In some embodiments of the invention, responsive to a determination that the number of distinguishable colors required does not exceed a number of available colors, methods can include overlaying objects with distinguishable patterns, or with dynamic overlays, such as flashing colors. In some embodiments of the invention, objects can be grouped by type and all objects of the same type can be overlaid with the same color. For example, all road signs can be overlaid with yellow, or all signs of a certain type, such as stop signs, can be overlaid with blue.

Importance, for example a classification of "important" or "unimportant" can be determined based upon contextual information such as location, activity or color. For instance, safety issues can be pre-established as "important" (e.g., a moving object of a color the user cannot see) and can be determined based upon cognitive learning or based upon a set of scenario criteria (for instance, by determining a user is traveling on a highway). Another classification of "important" could be determined for issues pertaining to productivity at work (e.g., understanding the content of a slide presentation), which can be determined based upon cognitive learning or based upon a set of scenario criteria (for instance, by determining a user is performing a work-related activity).

Importance can be determined by a numerical value and comparison to a threshold. For instance, types of objects can be given a predetermined importance ranking or a raking can be developed through machine learning techniques. The learnings of importance can be specific to one user or across multiple users, such as users with a same type of vision deficiency or of a same type of activity in the context of multiple users or a social network. These learnt important from the individual or social network can be selectively applied to a user. Such learning can be explicitly taught or provided by a user, or automatically determined based at least in part on a user's interaction with the object. For example, if the system colored an apple and orange with the same color, and a user ended up interacting with the apple and orange differently (e.g. eat the orange, and put the apple in the refrigerator), an exemplary system according to some embodiments of the invention can learn that apple and orange should be distinguished. The system could in some cases, for example, decide that distinguishing apple and orange is not required for safety reason, but is a desirable feature for the user, in particular when the orange and apple have similar colors. Therefore, the exemplary system could distinguish an apple from an orange only if an available unused color exists.

In some embodiments of the invention, the image overlay can include a color replacement for an object. In some embodiments of the invention, the image overlay can include flashing, highlighting, outlining, labeling with text, combinations of colors and patterns, or combinations of the foregoing. In some embodiments of the invention, the image overlay includes an enhanced overlay for an object having an importance level above a threshold importance. For instance, an image overlay can include flashing boundaries around moving objects or annotated images when an object is obscured by a nearby object of similar color. For example, a red car traveling next to a red wall can be overlaid with an image including a flashing boundary around the car to enhance its visibility. For example, a brown cupcake and a white cupcake can be overlaid with labels such as "brown" or "white." In another example, the cupcakes can be labeled with intelligent annotation such as "peanut butter" and "lemon." Such intelligent annotations can be determined using contextual information retrieved from or captured by other sensors or devices such as Amazon Echo™, Google Home™, ordering systems for restaurants, Social Networks etc.

In some embodiment of the invention, the system can predict a user's location in the future (i.e., can provide time-dependent location information), identify objects based on the predicted locations, and provide vision assistance. For example, a user might indicate on the calendar or social network that he is going to a restaurant down the block. Based on historical information, a system can determine that the user walks (instead of driving) to the restaurant 90% of time. In this example, the system can provide vision assistance based on the path that the user typically walks to the restaurant and, optionally, can provide vision assistance regarding the objects and their colors within the restaurant.

In some embodiments of the invention, the system can include provide vision assistance to a user that is moving such as walking, running, hopping, climbing, and/or moving on a vehicle such as wheel chair, bicycle, manual scooter, or electric scooter. For example, the system can provide vision assistance to a user walking outdoor in a park, on the street; walking indoor within the home, in a shopping mall, in a gym, at a construction site; running on a trail, or on a treadmill.

In some embodiment of the invention, the system can analyze objects not currently within sight of the user, but that are in proximity to the user. For example, if the user is in the gym, all objects within the gyms can be assessed for importance.

In some embodiments of the invention, the user's historical preferences can be analyzed and used to provide vision assistance. For example, where a user is currently on a treadmill in the gym, the system can determine that the user will likely next go rock climbing based upon historical data or user input. The system can consider the color of the rock climbing facility and objects within the facility and the rest of the gym, and provide vision assistance in the form of color highlighting, overlays and color replacement to provide consistent visual assistant to the user. For example, flashing yellow could consistently be used on all dangerous items in view of the user, allowing the user to form an alerting pattern. In another example, all objects within a coffee shop can be analyzed where a user is currently refilling coffee and all pastries in the coffee shop, for instance pastries with allergens in the coffee shop, can be highlighted in a uniform manner, and the color for those pastries can be "freed up" and used for other objects.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There can be many variations to this diagram or the steps (or operations) described therein without departing from the spirit of embodiments of the invention. For instance, the steps can be performed in a differing order or steps can be added, deleted, or modified. All of these variations are considered a part of the claimed invention.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for remediating a vision deficiency, the method comprising:
    receiving, by a processor, time dependent location information for a user, wherein the time dependent location information comprises a route for the user;
    receiving, by the processor, images of a plurality of objects, wherein each of the plurality of objects corresponds to the time dependent location information and, for each of the plurality of objects, identifying an object type and an object color;
    determining a number of distinguishable colors required to remediate a color vision deficiency and a number of available colors; and
    overlaying one of the plurality of objects with an available color responsive to a determination that the number of distinguishable colors does not exceed the number of available colors.

2. The computer-implemented method of claim 1 further comprising classifying each of the plurality of objects as important or unimportant.

3. The computer-implemented method of claim 2 further comprising overlaying an unimportant object with a color in use to generate a new available color.

4. The computer-implemented method of claim 3 further comprising overlaying an important object with the new available color.

5. The computer-implemented method of claim 2 wherein classifying each of the plurality of objects as important or unimportant is based at least in part upon a context.

6. The computer-implemented method of claim 2 wherein classifying each of the plurality of objects as important or unimportant is based at least in part upon the object type.

7. The computer-implemented method of claim 5, wherein the context comprises a location classification, a user activity, or a user preference.

8. The computer-implemented method of claim 2 further comprising generating an enhanced overlay for an important object.

9. The computer-implemented method of claim 8, wherein the enhanced overlay comprises a flashing color.

10. A processing system for remediating a vision deficiency, comprising:
    a processor in communication with one or more types of memory, the processor configured to:
    receive time dependent location information for a user, wherein the time dependent location information comprises a route for the user;
    receive images of a plurality of objects, wherein each of the plurality of objects corresponds to the time dependent location information and, for each of the plurality of objects, identify an object type and an object color;
    determine a number of distinguishable colors required to remediate a color vision deficiency and a number of available colors; and
    overlay one of the plurality of objects with an available color responsive to a determination that the number of distinguishable colors does not exceed the number of available colors.

11. The processing system of claim 10, wherein the processor is configured to classify each of the plurality of objects as important or unimportant.

12. The processing system of claim 11, wherein the processor is further configured to overlay an unimportant object with a color in use to generate a new available color.

13. The processing system of claim 12, wherein the processor is further configured to overlay an important object with the new available color.

14. The processing system of claim 11, wherein classifying each of the plurality of objects as important or unimportant is based at least in part upon a context.

15. The processing system of claim 14, wherein the context comprises a location classification, a user activity, or a user preference.

16. The processing system of claim 11, wherein classifying each of the plurality of objects as important or unimportant is based at least in part upon the object type.

17. The processing system of claim 11, wherein the processor is further configured to generate an enhanced overlay for an important object.

18. The processing system of claim 17, wherein the enhanced overlay comprises a flashing color.

19. A computer program product for remediating a vision deficiency, the computer program product comprising:
    a computer readable storage medium readable by a processing circuit and storing program instructions for execution by the processing circuit for performing a method comprising:
    receiving time dependent location information for a user, wherein the time dependent location information comprises a route for the user;
    receiving images of a plurality of objects, wherein each of the plurality of objects corresponds to the time dependent location information and, for each of the plurality of objects, identifying an object type and an object color;
    determining a number of distinguishable colors required to remediate a color vision deficiency and a number of available colors; and
    overlaying one of the plurality of objects with an available color responsive to a determination that the number of distinguishable colors does not exceed the number of available colors.

20. The computer program product of claim 19, wherein the method further comprises classifying each of the plurality of objects as important or unimportant.

* * * * *